(12) United States Patent
Kim

(10) Patent No.: US 12,709,176 B2
(45) Date of Patent: Aug. 18, 2026

(54) ELECTRIC VEHICLE CHARGEABLE BY WIND ENERGY

(71) Applicant: Yong Ho Kim, Paju-si (KR)

(72) Inventor: Yong Ho Kim, Paju-si (KR)

( * ) Notice: Subject to any disclaimer, the term of this patent is extended or adjusted under 35 U.S.C. 154(b) by 21 days.

(21) Appl. No.: 18/923,867

(22) Filed: Oct. 23, 2024

(65) Prior Publication Data

US 2025/0313108 A1 Oct. 9, 2025

(30) Foreign Application Priority Data

Apr. 4, 2024 (KR) ........................ 10-2024-0046233

(51) Int. Cl.

*F03D 9/25* (2016.01)
*B60L 53/51* (2019.01)
*B60L 53/52* (2019.01)
*B60L 53/60* (2019.01)
*F03D 9/00* (2016.01)
*F03D 9/32* (2016.01)
*H02K 7/18* (2006.01)

(52) U.S. Cl.

CPC ............... *B60L 53/52* (2019.02); *B60L 53/51* (2019.02); *B60L 53/60* (2019.02); *F03D 9/25* (2016.05); *F03D 9/32* (2016.05); *H02K 7/183* (2013.01); *F03D 9/007* (2013.01); *F05B 2220/706* (2013.01); *F05B 2220/708* (2013.01); *F05B 2240/941* (2013.01)

(58) Field of Classification Search

CPC .......... B60L 53/52; B60L 53/51; B60L 53/60; B60L 8/003; B60L 8/006; F03D 9/25; F03D 9/32; F03D 9/007; F03D 9/11; H02K 7/183; F05B 2220/706; F05B 2220/708; F05B 2240/941; B60K 2016/003; B60K 16/00; Y02E 10/72; Y02T 10/7072

See application file for complete search history.

(56) References Cited

U.S. PATENT DOCUMENTS 8,436,485 B1 * 5/2013 Smith ........................ F03D 9/11 290/55
2011/0100731 A1 * 5/2011 Hassan .................... B60L 50/60 180/2.2
2013/0306389 A1 * 11/2013 Penev ..................... B60L 8/003 180/165

FOREIGN PATENT DOCUMENTS

CN 102267391 A * 12/2011
CN 115447582 A * 12/2022 ............... H02N 2/18
KR 10-2005-0107864 11/2005

(Continued)

*Primary Examiner* — Aniss Chad
*Assistant Examiner* — Nikki Marie M Molina
(74) *Attorney, Agent, or Firm* — LEX IP MEISTER, PLLC

(57) ABSTRACT

An electric vehicle chargeable by wind energy, enabling travel using electricity generated by wind power generation is provided. The electric vehicle includes an air inlet formed on the front of the electric vehicle to allow wind to flow in during traveling, a turbine formed at a rear end of the air inlet and rotated by wind power, a power generation unit including a rotor coupled to a rotating shaft extended from the turbine and a stator disposed in a ring shape on the outside of the rotor and generating power by rotation of the rotor, a power supply unit converting power from the power generation unit into a chargeable voltage to charge a battery and supplying a driving voltage from the battery to the electric motor, and a controller electrically connecting the battery and the electric motor controlling charging from the power generation unit to the battery.

9 Claims, 6 Drawing Sheets

(56) References Cited

FOREIGN PATENT DOCUMENTS

| | | | | | |
|---|---|---|---|---|---|
| KR | 20050107864 | A | * | 11/2005 | .............. B60L 8/006 |
| KR | 20100011392 | A | * | 2/2010 | ............... F03D 3/04 |
| KR | 10-1146089 | | | 5/2012 | |
| KR | 10-2014-0022728 | | | 2/2014 | |
| KR | 20200015341 | A | * | 2/2020 | .............. B60L 53/52 |
| KR | 20230128991 | A | * | 9/2023 | ............. F03D 1/044 |

* cited by examiner

[FIG. 1]
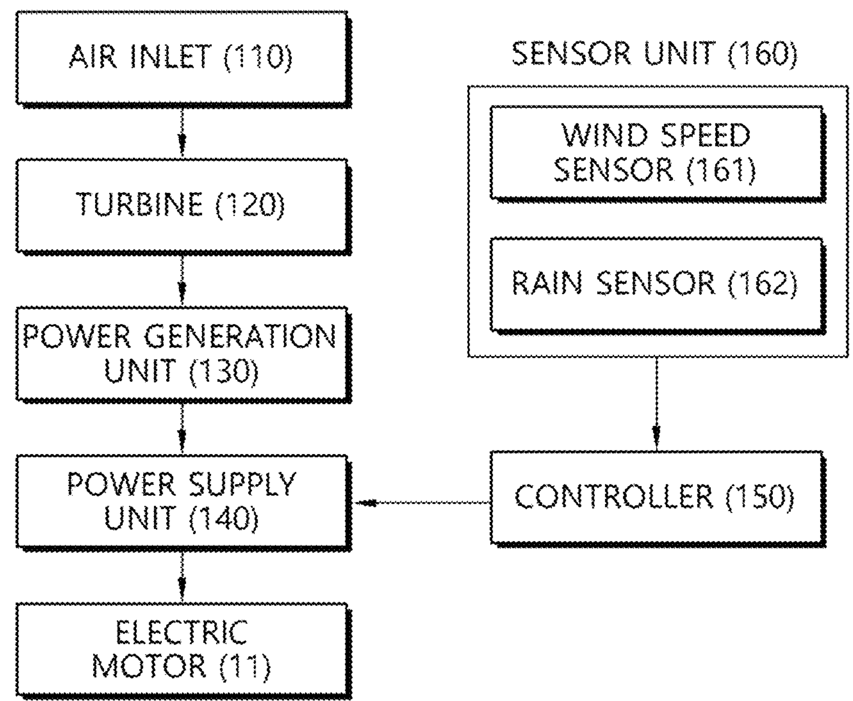

[FIG. 2(a)]
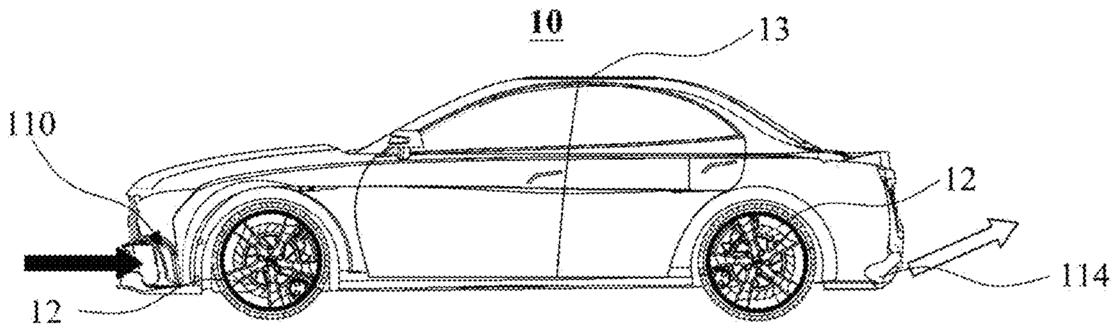
[FIG. 2(b)]
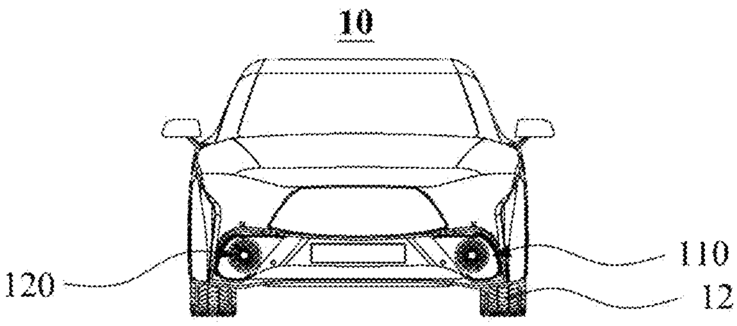

[FIG. 3]
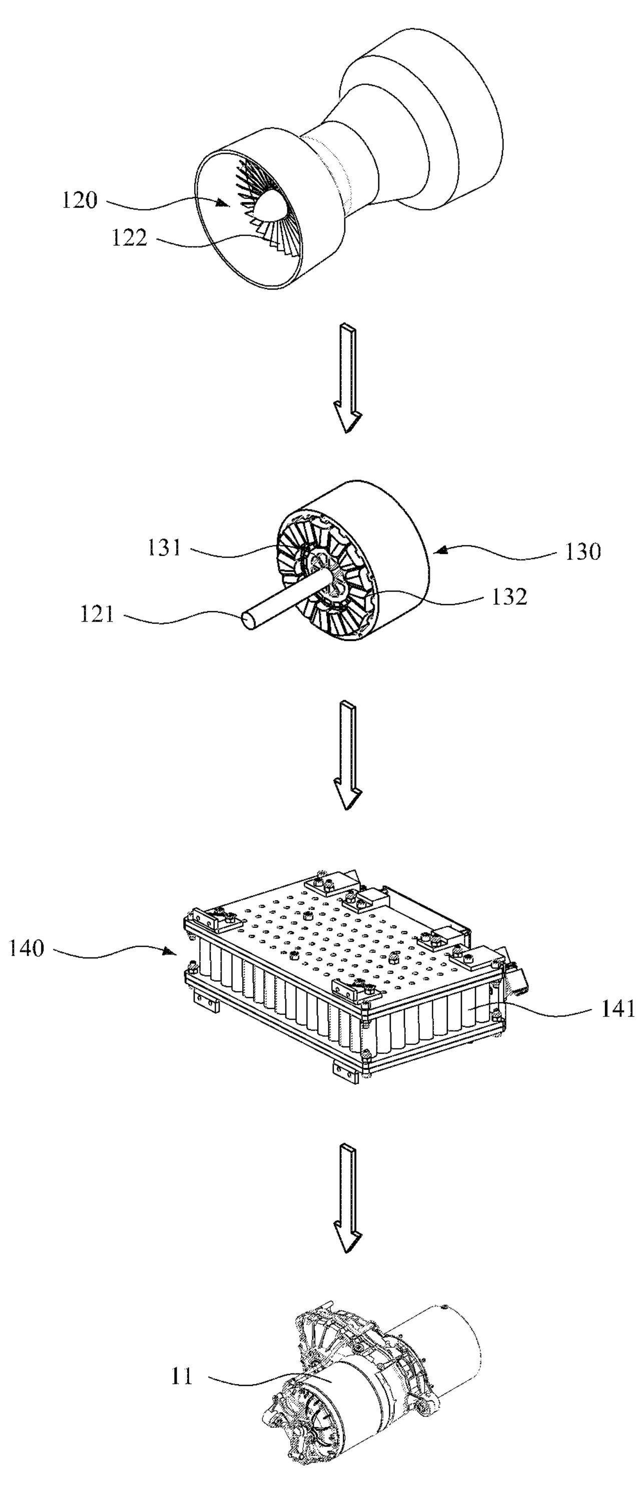

[FIG. 4]
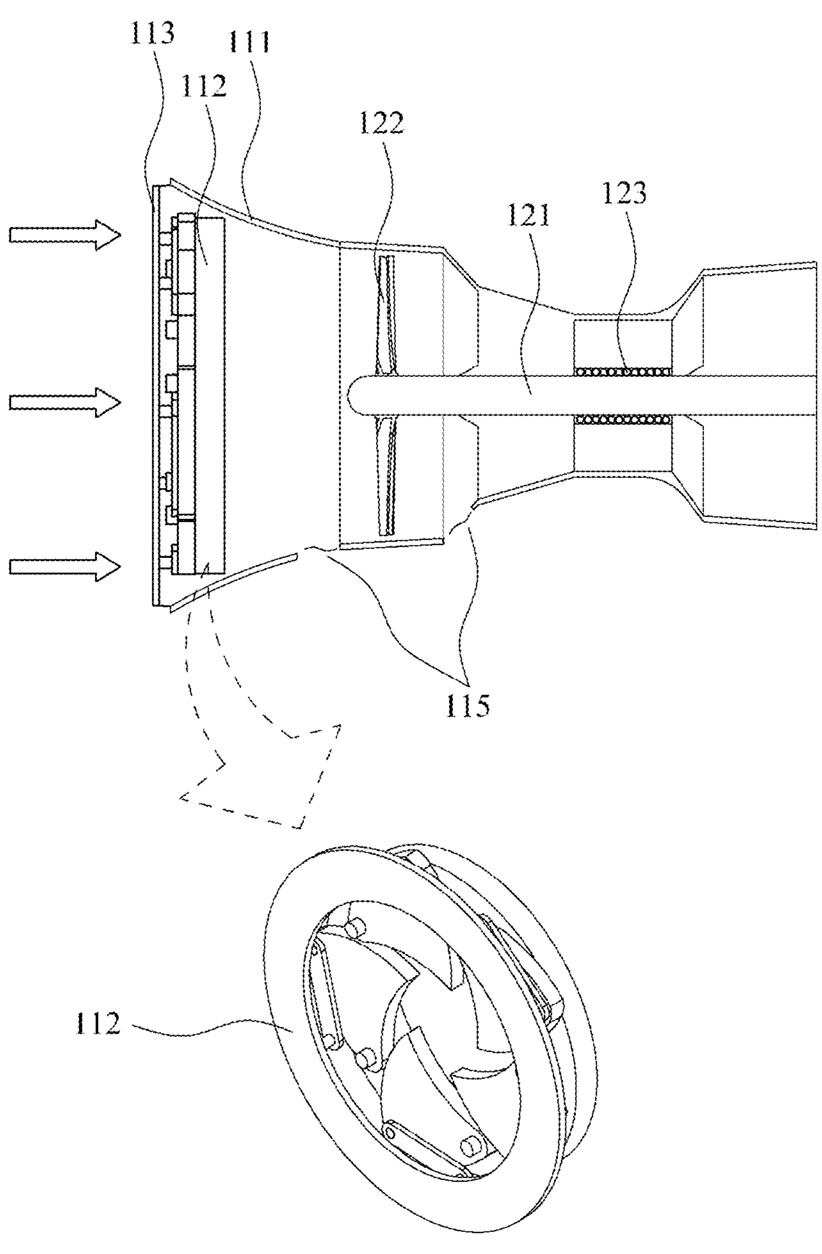

[FIG. 5(a)]
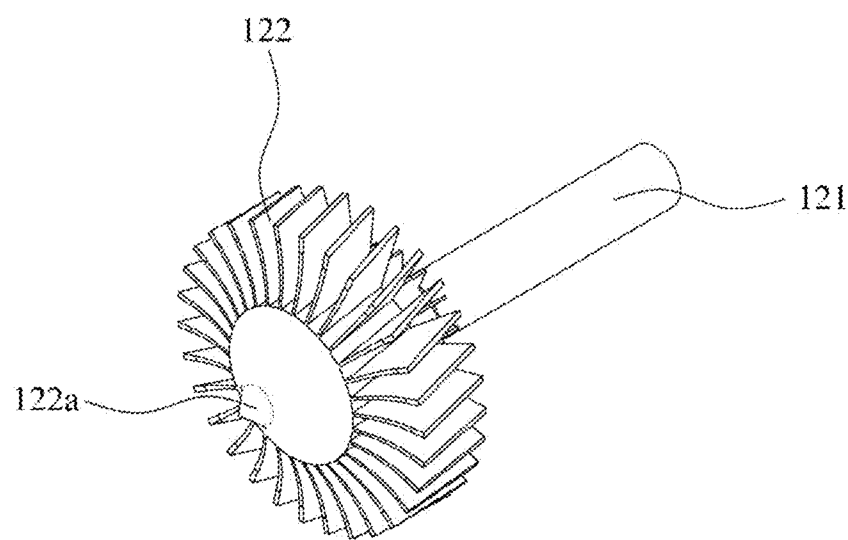
[FIG. 5(b)]
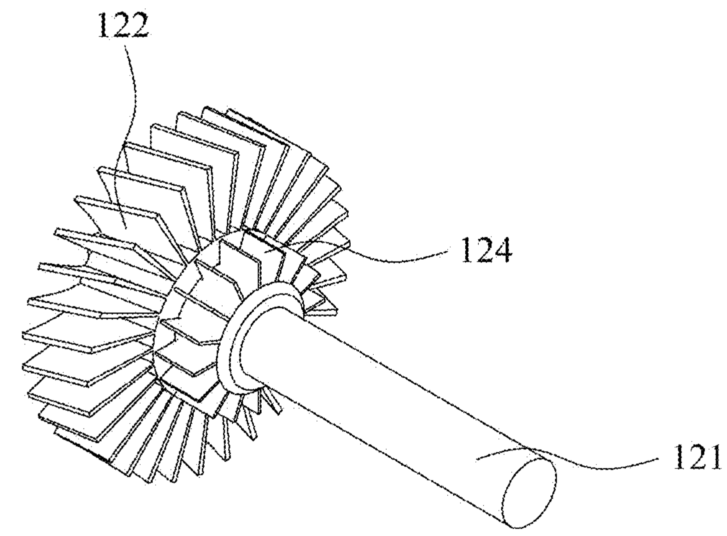

[FIG. 6(a)]
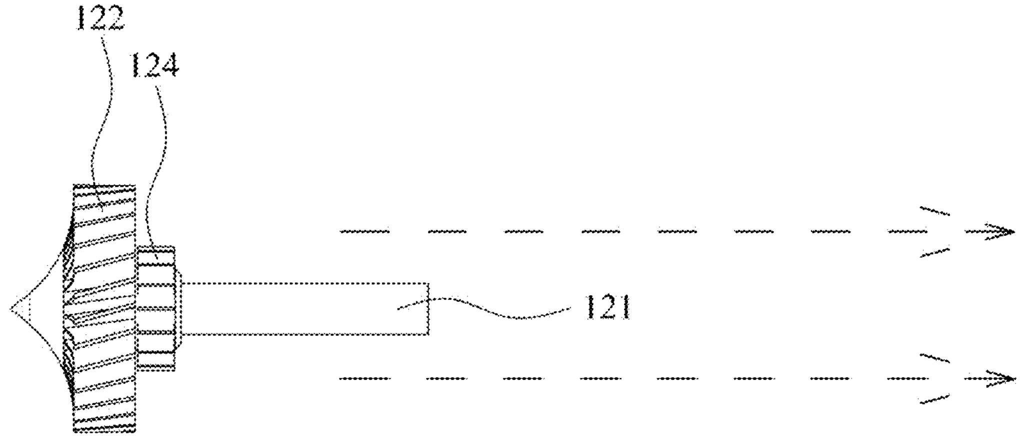
[FIG. 6(b)]
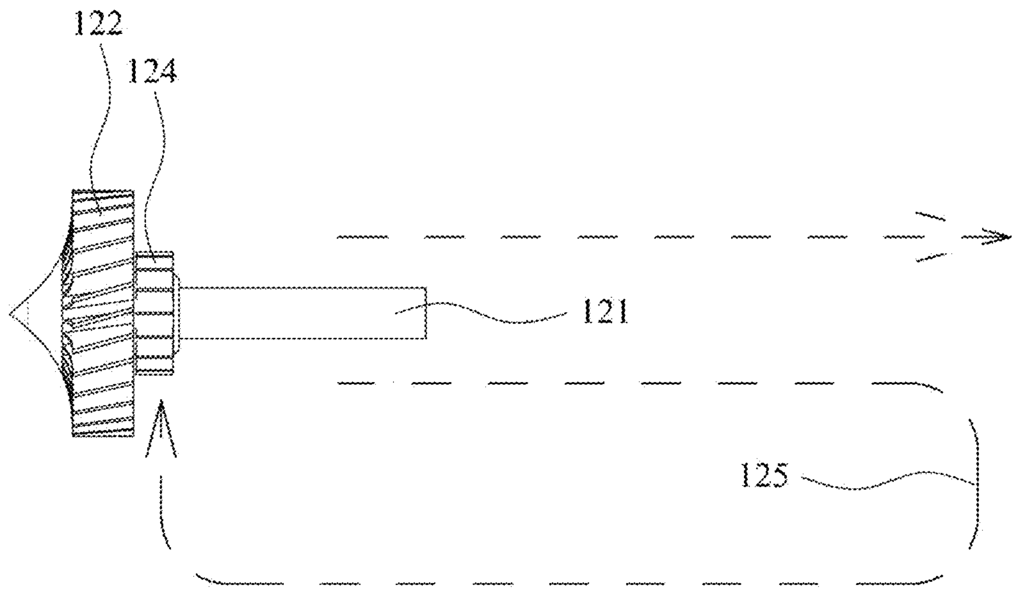

ELECTRIC VEHICLE CHARGEABLE BY WIND ENERGY

TECHNICAL FIELD

The present invention relates to an electric vehicle that can be charged by wind energy, which enables travel using electricity generated by wind power generation.

BACKGROUND ART

As is well known, electric vehicles are being actively developed as a means to replace fossil fuel-powered vehicles.

This is because, along with the recent surge in oil prices, concerns about the depletion of fossil fuels, and especially the problem of environmental pollution such as vehicle exhaust fumes when using fossil fuels as a power source, are becoming serious issues.

As a result, the development of future vehicles such as hybrid vehicles, electric vehicles, fuel cell vehicles, and hydrogen vehicles that can replace gasoline or diesel as fuel has become a major concern in vehicle industry. Conventionally developed electric vehicles travel on the road by charging a certain amount of electricity, and when the charged battery is consumed, the battery is recharged and used again. However, since there are not many charging stations that charge the electricity of vehicles, charging is not easy.

Accordingly, there is a demand for the development of an electric vehicle that can increase a traveling distance by generating electricity during traveling of a vehicle and supplying the electricity to the battery.

DISCLOSURE

Technical Problem

The technical problem that the present invention is to achieve is to provide an electric vehicle that can be charged by wind energy, which can reduce air pollution by not using fossil fuels and reduce the cost of charging electricity at electric charging stations by enabling travel using electricity generated by wind power generation.

Technical Solution

In order to achieve to the above-described object, according to an embodiment of the present invention, there is provided an electric vehicle chargeable by wind energy, the electric vehicle including: an air inlet that is formed in the front of the electric vehicle traveled by rotating a wheel by an electric motor to allow wind to flow in during traveling; a turbine that is formed at a rear end of the air inlet and rotated by wind power; a power generation unit that includes a rotor coupled to a rotating shaft extended from the turbine and a stator disposed in a ring shape on the outside of the rotor and generates power by rotation of the rotor; a power supply unit that converts power from the power generation unit into a chargeable voltage to charge a battery and supplies a driving voltage from the battery to the electric motor; and a controller that electrically connects the battery and the electric motor through an electrical system and controls charging from the power generation unit to the battery.

Here, the electric vehicle may further include a sensor unit including a wind speed sensor formed on the front of the electric vehicle to measure wind speed during traveling, and a rain sensor to measure rainfall during a rainy season, in which the air inlet may include an air inlet path formed to be recessed in a center or both sides of a front lower portion of the electric vehicle, and an opening/closing port formed in the air inlet path and having an aperture structure to open/close the air inlet path, and the controller may operate the opening/closing port to open the air inlet path when a measurement value above a certain level is detected by the wind speed sensor.

Moreover, the electric vehicle may further include a filter net formed at the front end of the air inlet path to block the inflow of external foreign substances and a blocking film formed at the front of the filter net to open and close, in which the controller may open the blocking film when the electric vehicle travels at a certain speed or higher.

In addition, the turbine may include a blade coupled to the rotation shaft, a bearing guiding the rotation of the rotation shaft, and an encoder measuring a rotation number of the rotation shaft, and the controller may control whether to charge the battery from the power generation unit according to the the rotation number by the encoder.

Further, the air inlet path may be formed with a tapered cross-sectional structure whose diameter narrows toward the turbine.

Moreover, an exhaust port communicating with the air inlet path may be formed at the rear of the electric vehicle, and a size of the exhaust port is formed to be relatively larger than a size of the air inlet path.

In addition, the exhaust port may be formed to extend to be inclined at a certain angle upward from the ground.

Moreover, solar cell modules may be arranged on an upper portion of a body of the electric vehicle.

Further, the blade may be formed in two stages to be respectively disposed at front and rear ends of the rotating shaft.

In addition, a nacelle may be formed to protrude at a front center of the blade.

Advantageous Effects

According to the present invention, a vehicle can travel using electricity generated by wind power generation. Therefore, it is possible to reduce air pollution by not using fossil fuels, reduce electric charging costs at electric charging stations, and enable long-distance travel by electric charging even when traveling long distances or to areas where electric charging station infrastructure is not established.

DESCRIPTION OF DRAWINGS

FIG. 1 illustrates a configuration diagram of an electric vehicle that can be charged by wind energy according to one embodiment of the present invention.

FIGS. 2(*a*) and 2(*b*) illustrate implementation diagrams of the electric vehicle that can be charged by wind energy of FIG. 1.

FIG. 3 illustrates a separate example of the main configuration of the electric vehicle that can be charged by wind energy of FIG. 2.

FIG. 4 illustrates an example of internal structures of the air inlet and turbine of the electric vehicle that can be charged by wind energy of FIG. 2.

FIGS. 5(*a*) and 5(*b*) and FIGS. 6(*a*) and 6(*b*) illustrate separate examples of the turbine of the electric vehicle that can be charged by wind energy of FIG. 2, respectively.

[Description of Main Reference Numerals of Drawings]

| | |
|---|---|
| 10: electric vehicle | 11: electric motor |
| 12: wheel | 13: solar cell module |
| 110: air inlet | 111: air inlet path |
| 112: opening/closing port | 113: filter net |
| 114: exhaust port | 115: exhaust hole |
| 120: turbine | 121: rotating shaft |
| 122: blade | 122a: nacelle |
| 123: bearing | 124: auxiliary blade |
| 125: return induction furnace | 130: power generation unit |
| 131: rotor | 132: stator |
| 140: power supply unit | 141: battery |
| 150: controller | 160: sensor unit |
| 161: wind speed sensor | 162: rain sensor |

BEST MODE

Hereinafter, with reference to the attached drawings, one embodiment of the present invention having the above-described features will be described in more detail.

According to an embodiment of the present invention, an electric vehicle, which can be charged by wind energy, includes an air inlet 110 that is formed in the front of the electric vehicle 10 traveled by rotating a wheel 12 by an electric motor 11 to allow wind to flow in during traveling, a turbine 120 that is formed at a rear end of the air inlet 110 and rotated by wind power, a power generation unit 130 that includes a rotor 131 coupled to a rotating shaft 121 extended from the turbine 120 and a stator 132 disposed in a ring shape on the outside of the rotor 131 and generates power by rotation of the rotor 131, a power supply unit 140 that converts power from the power generation unit 130 into a chargeable voltage to charge a battery 141 and supplies a driving voltage from the battery 141 to the electric motor 11, and a controller 150 that electrically connects the battery 141 and the electric motor 11 through an electrical system and controls charging from the power generation unit 130 to the battery 141. Therefore, a vehicle can travel using the electricity generated by wind power generation.

Hereinafter, with reference to FIGS. 1 to 6, an electric vehicle that can be charged by wind energy of the aforementioned configuration will be specifically described as follows.

First, with reference to FIGS. 1 and 2, the air inlet 110 is formed in the front of the electric vehicle 10 that travels by rotating the wheel 12 by the electric motor 11, so that wind is smoothly introduced when the vehicle travels at a certain speed or higher, thereby inducing the turbine 120.

Here, the air inlet 110 may be fitted to be recessed as a single configuration at the bottom of a central license plate or the inside of a radiator, or as a pair on both sides adjacent to a fog lamp, so as to be connected to the turbine 120.

Meanwhile, the electric vehicle 10 further includes the sensor unit 160 including a wind speed sensor 161 formed on the front of the electric vehicle 10 to measure wind speed during travel and a rain sensor 162 formed on the front of the electric vehicle 10 to measure rainfall during the rainy season, and as illustrated in FIG. 4, and the air inlet 110 includes an air inlet path 111 that is formed to be recessed in the center or both sides of the front lower portion of the electric vehicle 10 to guide the entry of wind, and an opening/closing port 112 that is formed in the air inlet path 111 and has an aperture structure to open/close the air inlet path 111. Moreover, the controller 150 may operate the opening/closing port 112 to open the air inlet path 111 to allow wind to flow in when a measurement value equal to or higher than a certain level is detected by the wind speed sensor 161, the controller 150 may close the opening/closing port 112 to block the inflow of external foreign substances when stopped, washed, or traveling at a low speed of 15 km/h or less, and the controller 150 may operate the opening/closing port 112 to close the air inlet path 111 when rainwater inflow into the air inlet path 111 is detected by the rain sensor 162.

In addition, the controller 150 may control the rotation speed of the rotating shaft 121 by controlling the degree of opening/closing of the opening/closing port 112 when the rotating shaft 121 rotates at a preset speed or higher according to the rotation speed thereof, thereby enabling stable power production.

Alternatively, a semicircular brake pad (not illustrated) may be coupled to the rotating shaft 121, and when the rotating shaft 121 rotates excessively, the controller 150 may control the brake pad to reduce the rotation speed of the rotating shaft 121 to maintain the structural stability of the blade 122 and reduce the friction between the rotating shaft 121 and the bearing 123 to minimize deformation due to high temperature.

In addition, referring to FIG. 4, the electric vehicle may further include a filter net 113 formed at the front end of the air inlet path 111 to block the inflow of external foreign substances and a blocking film formed at the front of the filter net 113 to open and close to protect the filter net 113, and when the electric vehicle travels at a certain speed or higher, the controller 150 may open the blocking film and block the inflow of external foreign substances by the filter net 113, thereby minimizing contamination or damage to the turbine 120.

Moreover, referring to FIG. 4, the air inlet path 111 is formed as a tapered cross-sectional structure whose diameter narrows toward the turbine 120, so that a flow rate increases and the rotational power of the blade 122 can be increased.

Meanwhile, an exhaust port 114 communicating with the air inlet path 111 may be formed at the rear of the electric vehicle 10, and the size of the exhaust port 114 is formed to be relatively larger than the size of the air inlet path 111, so that the introduced air can be discharged smoothly.

Here, the exhaust port 114 may be formed to be inclined at a certain angle upward from the ground and extended so that the air discharged from the exhaust port 114 makes minimal contact with the ground and is discharged upward (see FIG. 2). Therefore, travel stability can be supplemented by allowing a rear wheel to travel in close contact with the ground by air pressure.

In addition, according to the measurement value by the wind speed sensor 161, the controller 150 drives the opening/closing port 112 to maintain the flow rate of the wind supplied to the turbine 120 within a certain range. Accordingly, by maintaining the rotational amount of the turbine 120 within a certain range, stable power generation is possible by the power generation unit 130, and electrical stability can be secured by preventing excessive current from flowing to the battery 141.

In addition, as illustrated in FIG. 4, a discharge hole 115 is formed on the bottom surface of the air inlet path 111 at the front or rear end of the blade 122, so that foreign substances such as dust and rainwater introduced from the outside are discharged to the outside, and thus, it is possible to prevent contamination or corrosion of the turbine 120 and the power generation unit 130 and increase durability.

In addition, although not illustrated, a heating wire is built into the air inlet path 111, so that ice attached to the inside and outside of the air inlet path 111 in winter is melted and removed, and a separate driving motor (not illustrated) gear-coupled to a ring gear (not illustrated) of a rotating shaft 121 rotates the blade 122 in reverse to remove moisture. Therefore, it is possible to prevent moisture from entering the blade 122 during travel, prevent corrosion or the like, and increase durability.

Next, referring to FIG. 1 and FIG. 3, the turbine 120 is formed at the rear end of the air inlet 110 and rotates within a certain speed range by wind power flowing in from the air inlet 110.

Specifically, referring to FIG. 4 and FIG. 5, the turbine 120 includes the blade 122 that is coupled to the rotating shaft 121 and configured to rotate in only one direction, a bearing 123 that guides the rotation of the rotating shaft 121, and an encoder (not illustrated) that measures the the rotation number of the rotating shaft 121, and the controller 150 controls whether or not to charge the battery 141 from the power generation unit 130 according to the the rotation number by the encoder, thereby supplying power generated by rotational power equal to or greater than the certain rotation number to the battery 141 to enable stable charging.

In addition, although not illustrated, in the rotating shaft 121, a front shaft and a rear shaft are formed to be coupled to each other through coupling, and the controller 150 controls the coupling when the battery 141 is fully charged to block the coupling between the front and rear shafts, thereby preventing overcharging of the battery 141.

Alternatively, when the battery 141 is fully charged, the controller 150 may drive the opening/closing port 112 or the blocking film to close the opening/closing port or blocking film, thereby blocking the inflow of air and stopping the power generation by the turbine 120.

In addition, when the blade 122 rotates in a reverse direction which is not in a preset direction, the controller 150 may detect the reverse rotation through a sensor (not illustrated) and switch to block the connection with the battery, thereby blocking the reverse flow from the battery 141 to the power generation unit 130.

In addition, although not illustrated, a transmission gearbox may be provided in the coupling, so that in case of strong winds or high-speed travel exceeding 100 km/h, the controller 150 may control the transmission gearbox to ensure that the rotating shaft 121 rotates stably within a certain level range to produce a certain amount of power, thereby suppressing excessive voltage or current peaks and thus suppressing overload of the battery 141.

Meanwhile, referring to FIGS. 5 and 6, an auxiliary blade 124 is formed at the rear end of the blade 122 to form a double blade structure, and the exhaust port 114 is provided with a damper (not illustrated) and a return induction path 125. Therefore, optionally, (a) the air passing through the turbine 120 may be immediately discharged outside the vehicle, or may be re-directed through a pipe to the upper side surface or lower side surface of the auxiliary blade 124 to reinforce the rotational power of the rotating shaft 121. Accordingly, it is possible to maintain a certain level of rotational power or higher even during low-speed travel and product stable power.

Here, the return induction path 125 may be configured as a single configuration to communicate the upper side surface or the lower side surface of the auxiliary blade 124, or may be configured as a pair of opposing return guides so that one return induction path 125 communicates with the upper side surface of the auxiliary blade 124 and the other return induction path 125 communicates with the lower side surface of the auxiliary blade 124. Therefore, it is possible to increase the rotational power of the rotating shaft 121.

In addition, the blade 122 is formed in two stages by being respectively disposed at the front end and rear end of the rotating shaft 121 so that the contact area with the air can be expanded, thereby further increasing the rotational power. Moreover, referring to (a) of FIG. 5, a nacelle 122*a* is formed to protrude at the front center of the blade 122 so as to evenly distribute the pressure applied to the blade 122 by air.

Next, referring to FIGS. 1 and 3, the power generation unit 130 includes a rotor 131 coupled to the rotating shaft 121 extended from the turbine 120, and a stator 132 disposed in a ring shape on the outside of the rotor 131 and having a coil wound around the stator, and thus, power is generated by induced electromotive force through the rotation of the rotor 131 and supplied to the power supply unit 140.

Next, referring to FIGS. 1 and 3, the power supply unit 140 converts the power generated by the power generation unit 130 into a stable voltage that can be charged so that the power is charged in the battery 141, and supplies the driving voltage from the battery 141 to the electric motor 11.

Next, the controller 150 electrically connects the battery 141 and the electric motor 11 through the electrical system wired to the electric vehicle 10, and controls stable charging from the power generation unit 130 to the battery 141.

Meanwhile, a contamination sensor (not illustrated) that detects the contamination level of the air inlet 110 is further provided, and when a certain level of contamination is detected by the contamination sensor, the controller 150 may rotate the turbine 120 in the opposite direction to the rotation direction for power generation when the vehicle is stopped, thereby blowing and forcibly removing foreign substances attached to the opening/closing port 112 or the filter net 113.

In addition, referring to FIG. 2, a solar cell module 13 may be disposed on the upper portion of the body of the electric vehicle 10 so that the battery 141 is charged even when parked or traveling.

Therefore, by configuring the electric vehicle that can be charged by wind energy as described above, the electric vehicle can travel using electricity generated by wind power generation. Therefore, it is possible to reduce air pollution by not using fossil fuels, reduce electric charging costs at electric charging stations, and enable long-distance travel by electric charging even when traveling long distances or to areas where electric charging station infrastructure is not established.

The embodiments described in this specification and the configurations illustrated in the drawings are only the most preferred embodiments of the present invention, and do not represent all of the technical ideas of the present invention, so it should be understood that there may be various equivalents and modified examples that can replace them at the time of filing this application.

The invention claimed is:

1. An electric vehicle chargeable by wind energy, the electric vehicle comprising:

an air inlet that is formed in the front of the electric vehicle configured to travel by rotating a wheel by an electric motor to allow wind to flow in during traveling;

a turbine that is formed at a rear end of the air inlet and rotated by wind power;

a power generation unit that includes a rotor coupled to a rotating shaft extended from the turbine and a stator disposed in a ring shape on the outside of the rotor and generates power by rotation of the rotor;

a power supply unit that converts power from the power generation unit into a chargeable voltage to charge a battery and supplies a driving voltage from the battery to the electric motor;

a controller that electrically connects the battery and the electric motor through an electrical system and controls charging from the power generation unit to the battery; and a sensor unit including a wind speed sensor formed on the front of the electric vehicle to measure wind speed during traveling, and a rain sensor to measure rainfall during a rainy season, wherein the air inlet includes an air inlet path formed to be recessed in a center or both sides of a front lower portion of the electric vehicle, and an opening/closing port formed in the air inlet path and having an aperture structure to open/close the air inlet path, and wherein when a measurement value above a certain level is detected by the wind speed sensor, the controller operates the opening/closing port to open the air inlet path, wherein when rainwater inflow into the air inlet path is detected by the rain sensor, the controller operates the opening/closing port to close the air inlet path, wherein when the rotating shaft rotates at a preset speed or higher according to a rotation speed thereof, the controller controls the rotation speed of the rotating shaft by controlling a degree of opening/closing of the opening/closing port, wherein a semicircular brake pad is coupled to the rotating shaft, and when the rotating shaft rotates excessively, the controller controls the brake pad to reduce the rotation speed of the rotating shaft, wherein a discharge hole is formed on a bottom surface of the air inlet path at a front or rear end of a blade of the turbine, wherein an exhaust port communicating with the air inlet path is formed, and an auxiliary blade is formed at a rear end of the blade to form a double blade structure, and wherein the exhaust port is provided with a damper and a return induction path to re-direct air through a pipe to an upper side surface or a lower side surface of the auxiliary blade.

2. The electric vehicle of claim 1, further comprising a filter net formed at the front end of the air inlet path to block the inflow of external foreign substances and a blocking film formed at the front of the filter net to open and close, wherein the controller opens the blocking film when the electric vehicle travels at a certain speed or higher.

3. The electric vehicle of claim 1, wherein the turbine includes a blade coupled to the rotation shaft, a bearing guiding the rotation of the rotation shaft, and an encoder measuring a rotation number of the rotation shaft, and the controller controls whether to charge the battery from the power generation unit according to the rotation number by the encoder.

4. The electric vehicle of claim 3, wherein the blade is formed in two stages to be respectively disposed at front and rear ends of the rotating shaft.

5. The electric vehicle of claim 3, wherein a nacelle is formed to protrude at a front center of the blade.

6. The electric vehicle of claim 1, wherein the air inlet path is formed with a tapered cross-sectional structure whose diameter narrows toward the turbine.

7. The electric vehicle of claim 6, wherein an exhaust port communicating with the air inlet path is formed at the rear of the electric vehicle, and a size of the exhaust port is formed to be relatively larger than a size of the air inlet path.

8. The electric vehicle of claim 7, wherein the exhaust port is formed to extend to be inclined at a certain angle upward from the ground.

9. The electric vehicle of claim 1, wherein solar cell modules are arranged on an upper portion of a body of the electric vehicle.

* * * * *